United States Patent
Tsuruta et al.

(10) Patent No.: US 11,884,240 B2
(45) Date of Patent: Jan. 30, 2024

(54) USING AN ELECTROSTATIC FORCE TO CAUSE AN OBJECT TO ADHERE TO A SURFACE OF A VEHICLE

(71) Applicant: Toyota Motor Engineering & Manufacturing North America, Inc., Plano, TX (US)

(72) Inventors: Ryohei Tsuruta, Ann Arbor, MI (US); Shailesh N. Joshi, Ann Arbor, MI (US); Umesh N. Gandhi, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 452 days.

(21) Appl. No.: 17/202,928

(22) Filed: Mar. 16, 2021

(65) Prior Publication Data

US 2022/0297609 A1 Sep. 22, 2022

(51) Int. Cl.
*B60R 7/04* (2006.01)
*B60R 11/00* (2006.01)
(Continued)

(52) U.S. Cl.
CPC ............... *B60R 7/04* (2013.01); *B60R 11/00* (2013.01); *B60R 16/005* (2013.01); *B60R 16/03* (2013.01); *H02J 7/02* (2013.01)

(58) Field of Classification Search
CPC .. B60R 7/04; B60R 7/046; B60R 7/05; B60R 7/06; B60R 11/00; B60R 2011/0005;
(Continued)

(56) References Cited

U.S. PATENT DOCUMENTS

| | | |
|---|---|---|
| 6,879,809 B1 | 4/2005 | Vega et al. |
| 7,708,247 B2 | 5/2010 | Lota |
| (Continued) | | |

FOREIGN PATENT DOCUMENTS

| | | | |
|---|---|---|---|
| FR | 3062353 A1 * | 8/2018 | ............... B60R 7/04 |
| WO | WO-2012150028 A1 * | 11/2012 | ............. H02N 13/00 |

OTHER PUBLICATIONS

Sogard et al., "Comparison of Coulombic and Johnsen-Rahbek Electrostatic Chucking for EUV Lithography," J. of Micro/Nanolithography, MEMS, and MOEMS, vol. 8, No. 4, 32 pages, 2009.

(Continued)

*Primary Examiner* — Dennis H Pedder
(74) *Attorney, Agent, or Firm* — Christopher G. Darrow; DARROW MUSTAFA PC

(57) ABSTRACT

A system for using an electrostatic force to cause an object to adhere to a surface of a vehicle can include an electrode and a device. The electrode can be configured to be disposed within a structure of the vehicle. The structure can define the surface. A shape of the electrode can define a shape of a region of the surface. The device can be configured to connect the electrode to a voltage source so that, at a time at which the electrode is connected to the voltage source, an electric charge is produced on the electrode to produce the electrostatic force capable of causing the object to adhere to the surface. For example, the surface can include a dashboard, a dashboard vent frame, a sunglasses holder cover, or the like. For example, the object can include a mobile device, a cup, a pair of sunglasses, or the like.

20 Claims, 6 Drawing Sheets

(51) Int. Cl.
*H02J 7/02* (2016.01)
*B60R 16/00* (2006.01)
*B60R 16/03* (2006.01)

(58) Field of Classification Search
CPC ..... B60R 2011/0007; B60R 2011/0008; B60R 2011/0021; B60R 2011/0035
USPC .......................... 296/37.8, 37.12, 37.13, 97.5
See application file for complete search history.

(56) References Cited

U.S. PATENT DOCUMENTS

| | | |
|---|---|---|
| 7,815,484 B2 | 10/2010 | Kriman et al. |
| 10,253,531 B2 | 4/2019 | Ishihara et al. |
| 2011/0248059 A1 | 10/2011 | Sowers et al. |
| 2019/0371504 A1 | 12/2019 | Breiwa et al. |

OTHER PUBLICATIONS

Younesiraad et al., "Analysis of coupling between magnetic dipoles enhanced by metasurfaces for wireless power transfer efficiency improvement," Sci. Rep., vol. 9, pp. 1-11, Oct. 2018.
Neal Singer, "Labs patents cool tool to produce better microchips," Sandia LabNews, 2 pages, Mar. 27, 1998.
Unknown, "What is Electrostatic Chuck?" Edragon Technology Corporation, 5 pages, found at https://edragoncorp.weebly.com/what-is-electrostatic-chuck.html.
Zilinskas et al., "Electrostatic properties and characterization of specific polymeric materials for building purposes," Materials Science, vol. 16, No. 1, pp. 57-62, 2010.

\* cited by examiner

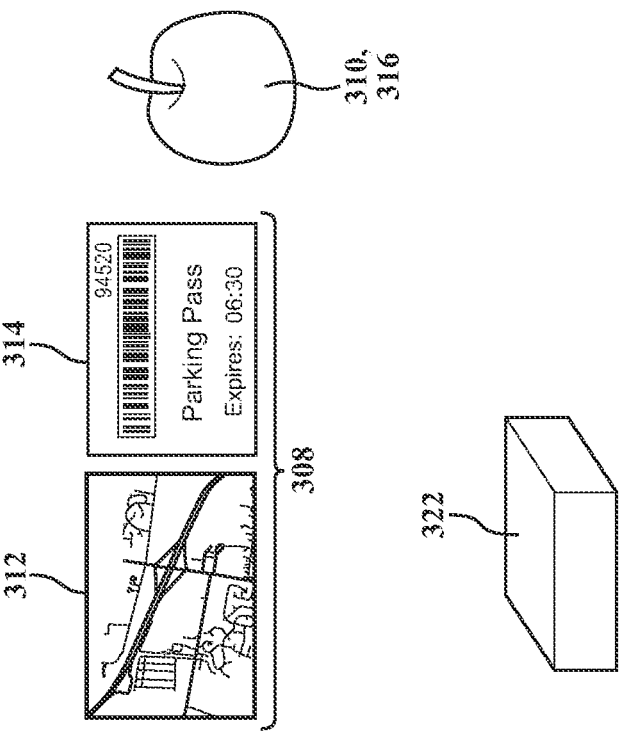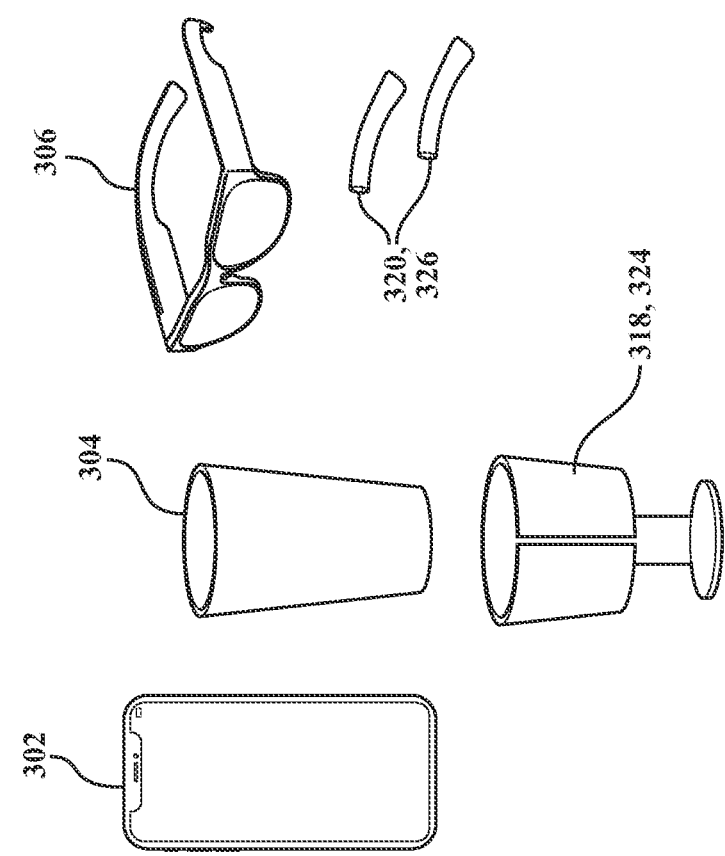
FIG. 3

USING AN ELECTROSTATIC FORCE TO CAUSE AN OBJECT TO ADHERE TO A SURFACE OF A VEHICLE

TECHNICAL FIELD

The disclosed technologies are directed to using an electrostatic force to cause an object to adhere to a surface of a vehicle.

BACKGROUND

A person can use various techniques to carry personal belongings and other objects. Such techniques can include, for example, a body part of the person, a pocket in an item of clothing worn by the person, a wallet, a handbag, a backpack, or the like. However, when the person is an operator or a passenger of a vehicle, such techniques may hinder an ability of the person easily to gain access to such personal belongings and other objects. For at least this reason, ergonomic considerations in a design of an interior of the vehicle can include accoutrements configured to support or hold such personal belongings and other objects. Such accoutrements can include, for example, a glove compartment, a console compartment, a console tray, a cup holder, a sunglasses holder, a coin holder, a door pocket, a sun visor pocket, a sun visor clip, or the like. A mobile device may be among the personal belongings that the person may desire to access as the operator or the passenger of the vehicle. To accommodate such a desire, various mobile device holders have been developed for use with the vehicle. Such mobile device holders often can include a mechanism to cause a mobile device holder to adhere to a dashboard of the vehicle. Unfortunately, not only does this configuration require the person to obtain such a mobile device holder, but also having the mobile device supported by such a mobile device holder on the dashboard may obstruct, for the person, a view through a windshield of the vehicle. Moreover, sometimes the mechanism to cause such a mobile device holder to adhere to the dashboard can cause a discoloration to occur at a location on the dashboard at which the mechanism caused the mobile device holder to adhere to the dashboard.

SUMMARY

In an embodiment, a system for using an electrostatic force to cause an object to adhere to a surface of a vehicle can include an electrode and a device. The electrode can be configured to be disposed within a structure of the vehicle. The structure can define the surface of the vehicle. A shape of the electrode can define a shape of a region of the surface. The device can be configured to connect the electrode to a voltage source so that, at a time at which the electrode is connected to the voltage source, an electric charge having a polarity is produced on the electrode to produce the electrostatic force capable of causing the object to adhere to the surface.

In another embodiment, a vehicle can include vehicle systems and an electrode. The vehicle systems can include a voltage source, a propulsion system, a transmission system, a throttle system, a braking system, and a steering system. The electrode can be disposed within a structure of the vehicle. The structure can define a surface of the vehicle. A shape of the electrode can define a shape of a region of the surface at which an electrostatic force is producible at a time at which the voltage source is connected to the electrode. The electrostatic force can be capable of causing an object to adhere to the surface.

In another embodiment, a method for using an electrostatic force to cause an object to adhere to a surface of a vehicle can include causing an electrode to be disposed within a structure of the vehicle. The structure can define the surface of the vehicle. A shape of the electrode can define a shape of a region of the surface. The method can include causing a device to be disposed within the vehicle. The device can be configured to connect the electrode to a voltage source so that, at a time at which the electrode is connected to the voltage source, an electric charge is produced on the electrode to produce an electrostatic force capable of causing an object to adhere to the surface.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 3 is a diagram that illustrates an example of objects that can be the object that can be caused to adhere to the surface of the vehicle, according to the disclosed technologies.

DETAILED DESCRIPTION

The disclosed technologies can include a system for using an electrostatic force to cause an object to adhere to a surface of a vehicle. The system can include an electrode and a device. The electrode can be configured to be disposed within a structure of the vehicle. The structure can define the surface. A shape of the electrode can define a shape of a region of the surface. The device can be configured to connect the electrode to a voltage source so that, at a time at which the electrode is connected to the voltage source, an electric charge having a polarity can be produced on the electrode to produce the electrostatic force capable of causing the object to adhere to the surface. For example, the object can be one or more of a mobile device, a cup, a pair of sunglasses, an item made of paper (e.g., a map or a ticket that indicates permission to park (e.g., a parking stub)), or the like. For example, the surface can be one or more of a dashboard, an instrument panel, a dashboard vent frame, a glove compartment cover, an airbag cover, a steering wheel, a column cover, a horn portion of the steering wheel, a console, a central console, a cup holder, an under-dashboard, a door interior panel, an overhead console, a sunglasses holder cover, a sun visor, or the like. For example, the voltage source can be one or more of an automotive battery, an electric vehicle battery, a fuel cell, or the like.

Figure 1:
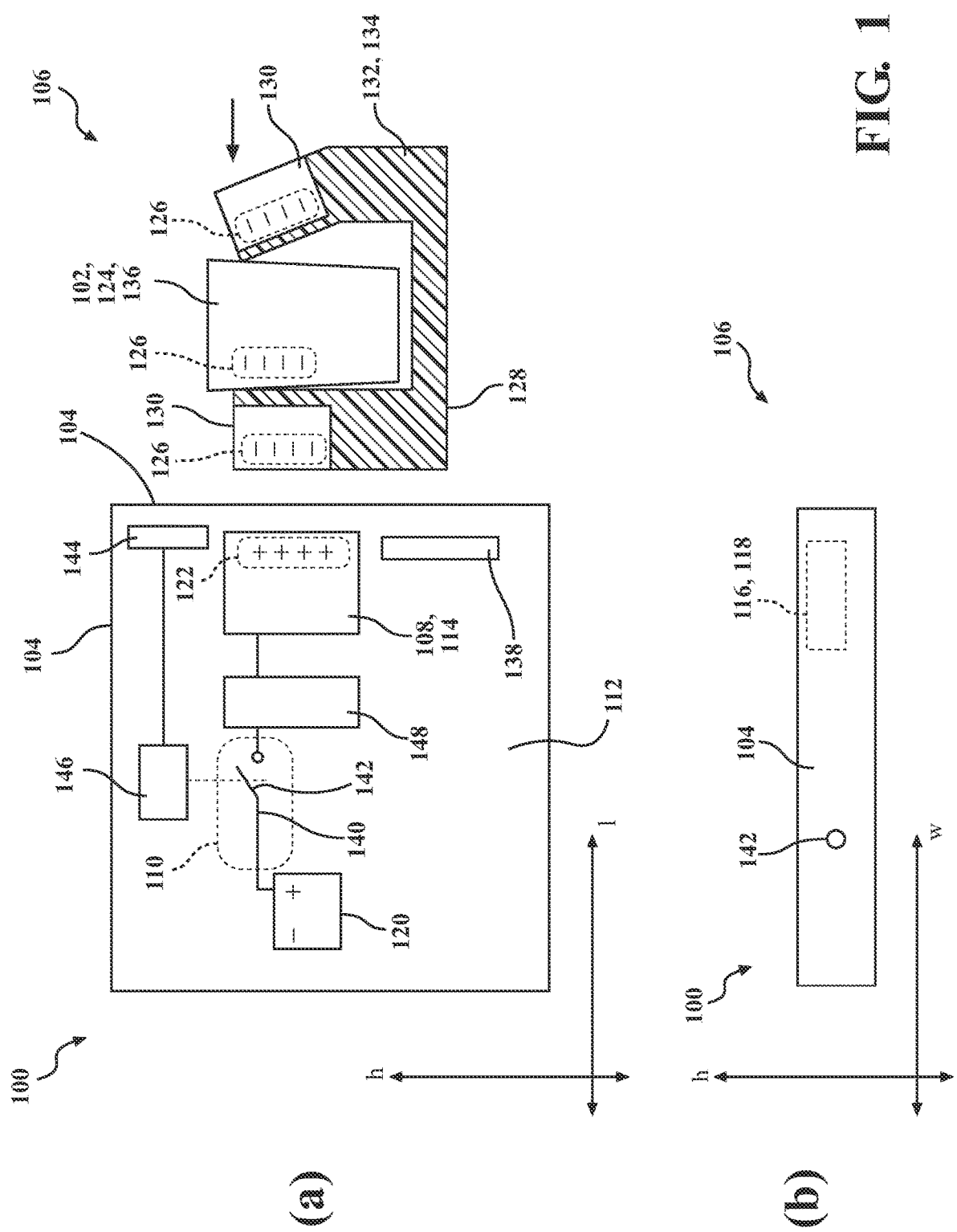
FIG. 1 is a diagram that illustrates an example of a system for using an electrostatic force to cause an object to adhere to a surface of a vehicle, according to the disclosed technologies.

FIG. 1 is a diagram that illustrates an example of a system 100 for using an electrostatic force to cause an object 102 to adhere to a surface 104 of a vehicle 106, according to the disclosed technologies. A view (a) of FIG. 1 is a diagram of the example of the system 100 from a perspective of a length-height (l-h) coordinate system. A view (b) of FIG. 1 is a diagram of the example of the system 100 from a perspective of a width-height (w-h) coordinate system. The system 100 can include, for example, an electrode 108 and a first device 110. The electrode 108 can be configured to be disposed within a structure 112 of the vehicle 106. The structure 112 can define the surface 104. A shape 114 of the electrode 108 can define a shape 116 of a region 118 of the surface 104. The first device 110 can be configured to connect the electrode 108 to a voltage source 120 so that, at a time at which the electrode 108 is connected to the voltage source 120, an electric charge 122 having a first polarity (e.g., +) can be produced on the electrode 108 to produce the electrostatic force capable of causing the object 102 to adhere to the surface 104.

A magnitude of the electrostatic force can be a function of Coulomb's law, the Johnsen-Rahbek effect, or both. The Johnsen-Rahbek effect can refer to an attractive force that occurs when an electric potential is applied across a boundary between a metallic surface and a surface of a semiconducting material. The attractive force produced by the Johnsen-Rahbek effect can depend upon a level of a voltage applied, properties of specific materials used, and a degree of roughness of surfaces at a contact layer between the metallic surface and the surface of the semiconductor material.

Figure 2:
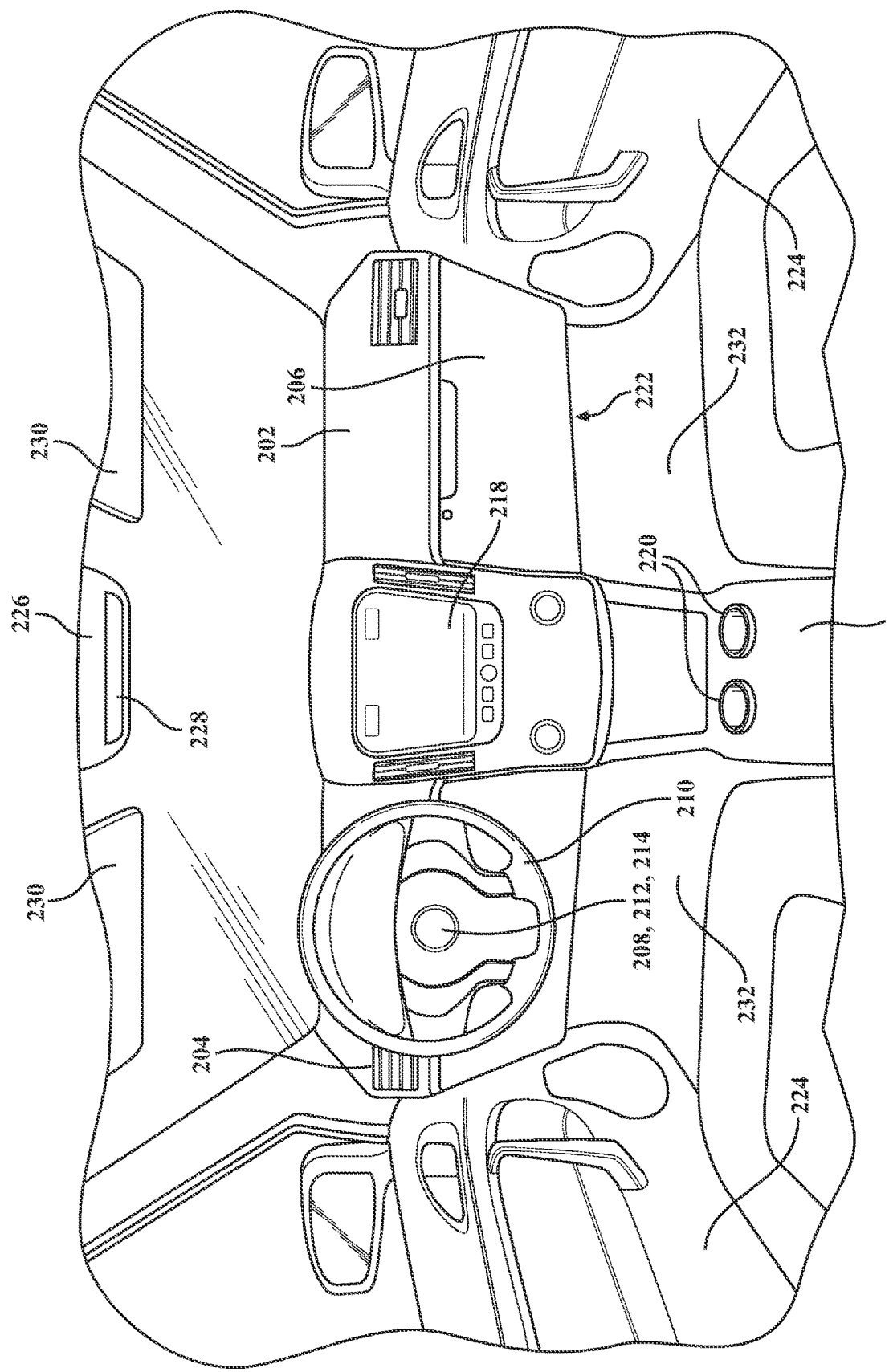
FIG. 2 is a diagram that illustrates an example of surfaces of the vehicle that can be the surface to which the object can be caused to adhere, according to the disclosed technologies.

FIG. 2 is a diagram that illustrates an example of surfaces of the vehicle 106 that can be the surface 104 to which the object 102 can be caused to adhere, according to the disclosed technologies. For example, the surface 104 of the vehicle 106 can include one or more of a dashboard 202, a dashboard vent frame 204, a glove compartment cover 206, an airbag cover 208, a steering wheel 210, a column cover 212, a horn portion 214 of the steering wheel 210, a console 216, a central console 218, a cup holder 220, an under-dashboard 222, a door interior panel 224, an overhead console 226, a sunglasses holder cover 228, a sun visor 230, or the like. For example, if the surface 104 to which the object 102 can be caused to adhere is the dashboard vent frame 204, then, advantageously, warm air can be caused to flow against the object 102 to raise a temperature of the object 102, or cool air can be caused to flow against the object 102 to lower the temperature of the object 102.

Returning to FIG. 1, for example, the object 102 can be made of a material 124 having a property associated with an ability to hold an electric charge 126 having a second polarity (e.g., −). A value of the property for the material 124 can be greater than an average value of the property for materials. The property can include, for example, one or more of a surface potential discharge rate, a layer capacitance, a volume resistance, or the like. For example, the object 102 can be made of one or more of metal, paper, glass, or the like.

Alternatively or additionally, for example, the system 100 can further include a second device 128. For example, the second device 128 can be made of a first material 130. For example, the second device 128 can be configured to one or more of support the object 102, hold the object 102, adhere to the object 102, be attached to the object 102, or the like. The first material 130 can have a property associated with an ability to hold the electric charge 126 having the second polarity (e.g., −). A value of the property for the first material 130 can be greater than an average value of the property for materials. The property can include, for example, one or more of the surface potential discharge rate, the layer capacitance, the volume resistance, or the like.

Additionally, for example, the second device 128 can be further made of a second material 132. The second material 132 can have a property associated with elasticity. A value of the property associated with elasticity for the second material 132 can be greater than an average value of the property associated with elasticity for materials. Additionally, for example, a shape 134 of the second device 128 can be configured to change, at the time at which the electrode 108 is connected to the voltage source 120, to conform to a shape 136 of the object 102. In this manner, the second device 128 can be made to securely hold the object 102.

FIG. 3 is a diagram that illustrates an example of objects that can be the object 102 that can be caused to adhere to the surface 104 of the vehicle 106, according to the disclosed technologies. For example, the object 102 can include one or more of a mobile device 302, a cup 304, a pair of sunglasses 306, an item made of paper 308, a piece of fruit 310, or the like. For example, the item made of paper 308 can be a map 312, a ticket that indicates permission to park 314 (e.g., a parking stub), or the like. For example, the piece of fruit 310 can be an apple 316 or the like.

With reference to FIGS. 1 through 3, in an implementation of the disclosed technologies in which the object 102 includes the mobile device 302, the system 100 can further include a wireless charger 138. For example, the wireless charger 138 can be configured to be disposed next to the electrode 108. For example, the wireless charger 138 can be configured to charge the mobile device 302.

In an implementation of the disclosed technologies in which the object 102 includes one or more of the cup 304 or the pair of sunglasses 306, the system 100 can further include the second device 128.

For example, if the object 102 includes the cup 304, then the second device 128 can include a cup holder 318. For example, the cup holder 318 can be made of the first material 130. Additionally, for example, the cup holder 318 can be further made of the second material 132. In this manner, the cup holder 318 can be made to securely hold the cup 304 at the time at which the electrode 108 is connected to the voltage source 120.

For example, if the object 102 includes the pair of sunglasses 306, then the second device 128 can include a device 320 configured to be attached to the pair of sunglasses 306 so that the pair of sunglasses 306 can be caused to adhere, at the time at which the electrode 108 is connected to the voltage source 120, to the sunglasses holder cover 228.

For example, the second device 128 can include a device 322 configured to be caused to adhere, at the time at which the electrode 108 is connected to the voltage source 120, to the under-dashboard 222. In this manner, the device 322 can provide an additional storage space that is elevated above a floor 232 of the vehicle 106.

For example, the first device 110 can include one or more of a conductor 140 or a switch 142.

For example, if the first device 110 includes the switch 142, then the switch 142 can be configured be disposed on the vehicle 106 so that a passenger of the vehicle 106 can operate the switch 142. Alternatively or additionally, for example, if the first device 110 includes the switch 142, then the switch 142 can be configured to be operated in a different manner. For example, operation of the switch 142 may be controlled by application software being executed by the mobile device 302.

For example, if the first device 110 includes the switch 142, then the system 100 can further include a tactile sensor 144 and a controller 146. For example, the tactile sensor 144 can be configured to be disposed within the structure 112 of the vehicle 106. For example, the tactile sensor 144 can be configured to detect a physical contact of the object 102 with the region 118 of the surface 104. For example, the controller 146 can be configured to control a position of the switch 142 so that, at a time at which the physical contact of the object 102 with the region 118 of the surface 104 is detected by the tactile sensor 144, the controller 146 can cause the position of the switch 142 to be a closed position. Additionally, for example, the controller 146 can be further configured to control the position of the switch 142 so that, at a time at which a lack of the physical contact of the object 102 with the region 118 of the surface 104 is detected by the tactile sensor 144, the controller 146 can cause the position of the switch 142 to be an opened position.

For example, the voltage source 120 can include one or more of a battery or a fuel cell. For example, the battery can include one or more of an automotive battery or an electric vehicle battery.

For example, the system 100 can further include circuitry 148. For example, the circuitry 148 can be configured to receive, from the voltage source 120, a voltage at a first voltage level. For example, the circuitry 148 can be configured to increase the voltage from the first voltage level to a second voltage level. For example, the second voltage level can be equal to or greater than one kilovolt. For example, the circuitry 148 can be configured to cause the voltage at the second voltage level to be applied to the electrode 108. For example, the circuitry 148 can include one or more of a capacitor, a voltage multiplier, a voltage doubler, a voltage converter, a step-up converter, a boost converter, a DC-to-DC converter, a transformer, a motor-generator, or the like.

Figure 4:
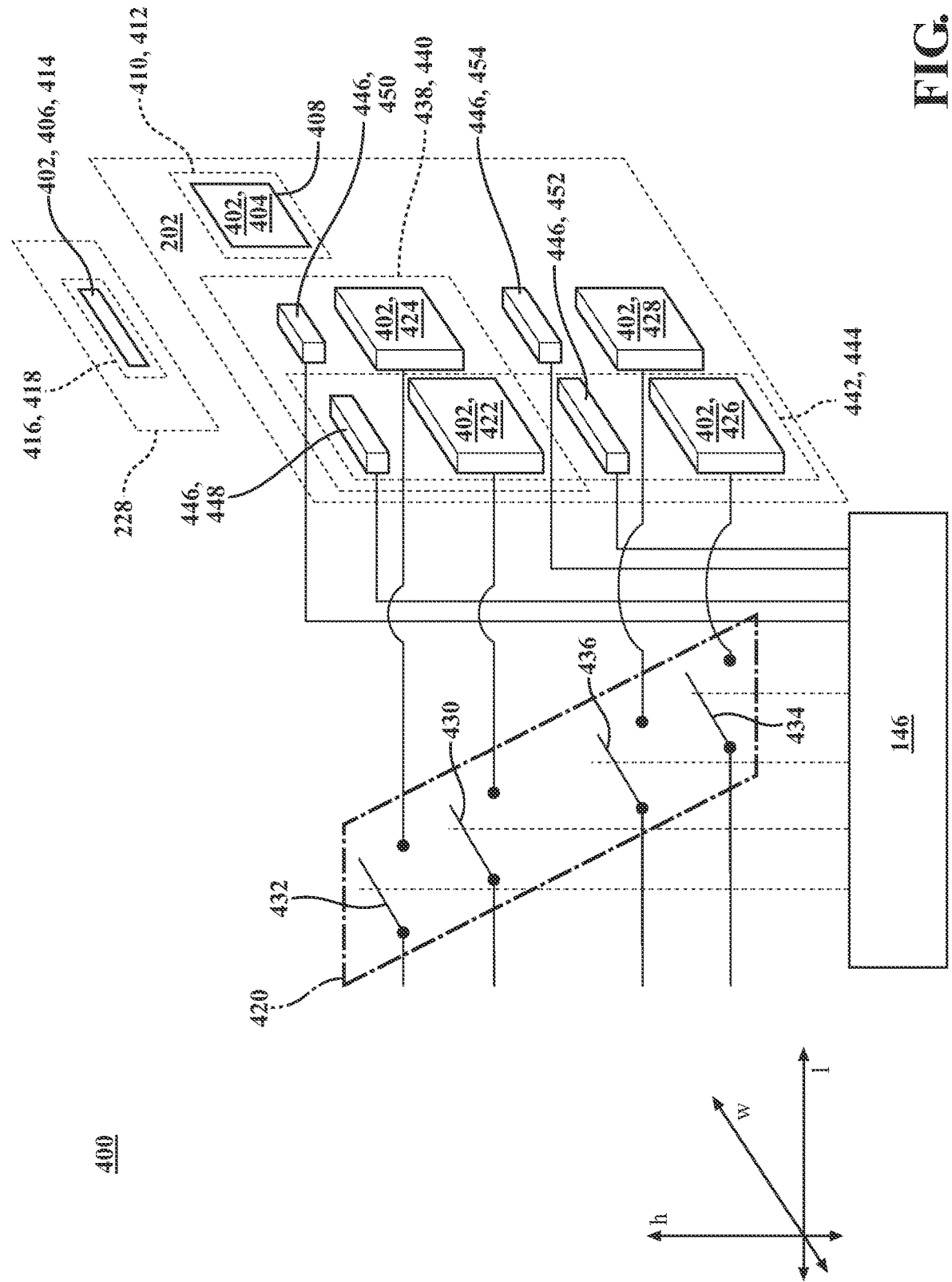
FIG. 4 is a diagram that illustrates an example of another system for using an electrostatic force to cause the object to adhere to the surface of the vehicle, according to the disclosed technologies.

FIG. 4 is a diagram that illustrates an example of another system 400 for using an electrostatic force to cause the object 102 to adhere to the surface 104 of the vehicle 106, according to the disclosed technologies. The system 400 can include, for example, the system 100 in which the electrode 108 includes an array of electrodes 402.

With reference to FIGS. 1 through 4, for example, the array of electrodes 402 can include a first electrode 404 and a second electrode 406. For example, a shape 408 of the first electrode 404 can define a shape 410 of a region 412 of the dashboard 202 as the surface 104. The shape 410 can correspond to a shape 324 of the cup holder 318. For example, a shape 414 of the second electrode 406 can define a shape 416 of a region 418 of the sunglasses holder cover 228 as the surface 104. The shape 416 can correspond to a shape 326 of the device 320 configured to be attached to the pair of sunglasses 306. Additionally, for example, a magnitude of the electrostatic force produced by the second electrode 406 can be sufficient to support the pair of sunglasses 306 while a magnitude of the electrostatic force produced by the first electrode 404 can be sufficient to support the cup 304 at a time at which the cup 304 contains 40 fluid ounces of a beverage.

For example, the system 400 can further include the system 100 in which the first device 110 includes an array of switches 420. For example, the array of electrodes 402 can further include a third electrode 422, a fourth electrode 424, a fifth electrode 426, and a sixth electrode 428. For example, the array of switches 420 can include a first switch 430, a second switch 432, a third switch 434, and a fourth switch 436. For example, the first switch 430 can be associated with the third electrode 422, the second switch 432 can be associated with the fourth electrode 424, the third switch 434 can be associated with the fifth electrode 426, and the fourth switch 436 can be associated with the sixth electrode 428.

For example, the system 400 can further include the controller 146. For example, the controller 146 can be configured to control positions of the first switch 430, the second switch 432, the third switch 434, and the fourth switch 436 so that a shape of a region of the surface 104 can conform to the shape 136 of the object 102. For example, if the object 102 is the mobile device 302 and the system 400 is to be used to cause the mobile device 302 to adhere to the surface 104 in a landscape mode (i.e., having a length of the mobile devices 302 be parallel to the width (w) axis), then the controller 146 can cause the positions of the first switch 430 and the second switch 432 to be closed positions so that a shape 438 of a region 440 of the surface 104 can conform to the shape 136 of the mobile device 302. For example, if the object 102 is the mobile device 302 and the system 400 is to be used to cause the mobile device 302 to adhere to the surface 104 in a portrait mode (i.e., having the length of the mobile devices 302 be parallel to the height (h) axis), then the controller 146 can cause the positions of the first switch 430 and the third switch 434 to be closed positions so that a shape 442 of a region 444 of the surface 104 can conform to the shape 136 of the mobile device 302.

Additionally, for example, the system 400 can further include the system 100 in which the tactile sensor 144 includes an array of tactile sensors 446. For example, the array of tactile sensors 446 can include a first tactile sensor 448, a second tactile sensor 450, a third tactile sensor 452, and a fourth tactile sensor 454. For example, the first tactile sensor 448 can be associated with the first switch 430 and the third electrode 422, the second tactile sensor 450 can be associated with the second switch 432 and the fourth electrode 424, the third tactile sensor 452 can be associated with the third switch 434 and the fifth electrode 426, and the fourth tactile sensor 454 can be associated with the fourth switch 436 and the sixth electrode 428.

For example, if the object 102 is the mobile device 302 and the system 400 is to be used to cause the mobile device 302 to adhere to the surface 104 in the landscape mode (i.e., having the length of the mobile devices 302 be parallel to the width (w) axis), then the controller 146 can cause, at a time at which a physical contact of the mobile device 302 with the region 440 of the surface 104 is detected by the first tactile sensor 448 and the second tactile sensor 450, the positions of the first switch 430 and the second switch 432 to be closed positions so that the shape 438 of the region 440 of the surface 104 can conform to the shape 136 of the mobile device 302. Additionally, for example, the controller 146 can cause, at a time at which a lack of the physical contact of the mobile device 302 with the region 440 of the surface 104 is detected by the first tactile sensor 448 and the second tactile sensor 450, the positions of the first switch 430 and the second switch 432 to be opened positions.

For example, if the object 102 is the mobile device 302 and the system 400 is to be used to cause the mobile device 302 to adhere to the surface 104 in the portrait mode (i.e., having the length of the mobile devices 302 be parallel to the height (h) axis), then the controller 146 can cause, at a time at which a physical contact of the mobile device 302 with the region 444 of the surface 104 is detected by the first tactile sensor 448 and the third tactile sensor 452, the positions of the first switch 430 and the third switch 434 to be closed positions so that the shape 442 of the region 444 of the surface 104 can conform to the shape 136 of the mobile device 302. Additionally, for example, the controller 146 can cause, at a time at which a lack of the physical contact of the mobile device 302 with the region 444 of the surface 104 is detected by the first tactile sensor 448 and the third tactile sensor 452, the positions of the first switch 430 and the third switch 434 to be opened positions.

Figure 5:
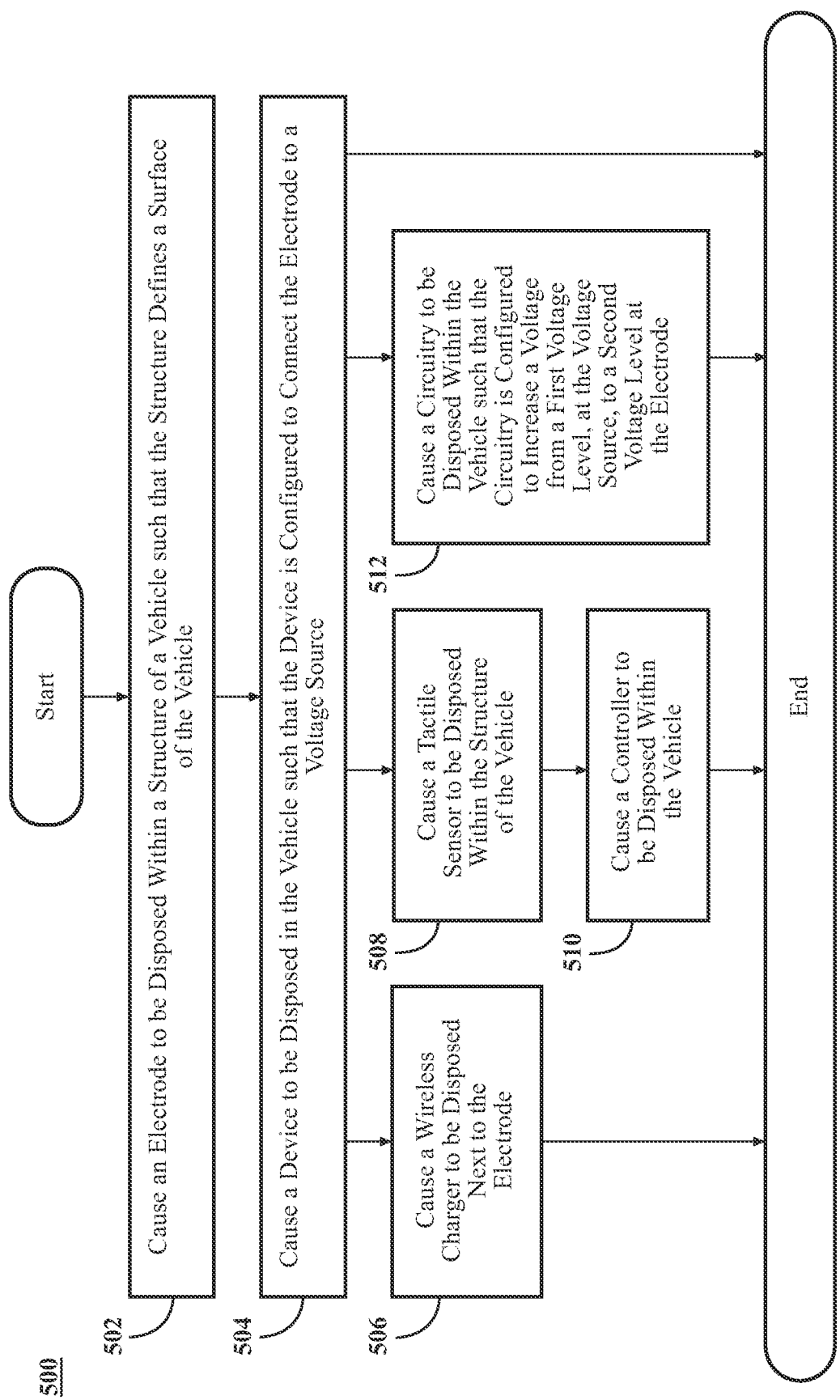
FIG. 5 is a flow diagram that illustrates an example of a method that is associated with using an electrostatic force to cause the object to adhere to the surface of the vehicle, according to the disclosed technologies.

FIG. 5 is a flow diagram that illustrates an example of a method 500 that is associated with using an electrostatic force to cause the object 102 to adhere to the surface 104 of the vehicle 106, according to the disclosed technologies. The method 500 is described from the perspective of the system 100 illustrated in FIG. 1 and the system 400 illustrated in FIG. 4. Although the method 500 is described in combination with the system 100 illustrated in FIG. 1 and the system 400 illustrated in FIG. 4, one of skill in the art understands, in light of the description herein, that the method 500 is not limited to being implemented by the system 100 illustrated in FIG. 1 or the system 400 illustrated in FIG. 4. Rather, the system 100 illustrated in FIG. 1 and the system 400 illustrated in FIG. 4 are two examples of systems that may be used to implement the method 500. Additionally, although the method 500 is illustrated as a generally serial process, various aspects of the method 500 may be able to be executed in parallel.

With reference to FIGS. 1 and 5, in the method 500, at an operation 502, for example, the electrode 108 can be caused to be disposed within the structure 112 of the vehicle 106. The structure 112 can define the surface 104 of the vehicle 106. The shape 114 of the electrode 108 can define the shape 116 of the region 118 of the surface 104.

At an operation 504, for example, the first device 110 can be caused to be disposed within the vehicle 106. The first device 110 can be configured to connect the electrode 108 to the voltage source 120 so that, at the time at which the electrode 108 is connected to the voltage source 120, the electric charge 122 can be produced on the electrode 108 to produce the electrostatic force capable of causing the object 102 to adhere to the surface 104.

The magnitude of the electrostatic force can be a function of Coulomb's law, the Johnsen-Rahbek effect, or both. The Johnsen-Rahbek effect can refer to an attractive force that occurs when an electric potential is applied across a boundary between a metallic surface and a surface of a semiconducting material. The attractive force produced by the Johnsen-Rahbek effect can depend upon the level of the voltage applied, the properties of the specific materials used, and the degree of roughness of the surfaces at the contact layer between the metallic surface and the surface of the semiconductor material.

With reference to FIGS. 1 and 2, for example, the surface 104 of the vehicle 106 can include one or more of the dashboard 202, the dashboard vent frame 204, the glove compartment cover 206, the airbag cover 208, the steering wheel 210, the column cover 212, the horn portion 214 of the steering wheel 210, the console 216, the central console 218, the cup holder 220, the under-dashboard 222, the door interior panel 224, the overhead console 226, the sunglasses holder cover 228, the sun visor 230, or the like. For example, if the surface 104 to which the object 102 can be caused to adhere is the dashboard vent frame 204, then, advantageously, warm air can be caused to flow against the object 102 to raise the temperature of the object 102, or cool air can be caused to flow against the object 102 to lower the temperature of the object 102.

With reference to FIGS. 1, 3, and 5, for example, if the object 102 includes the mobile device 302, then the method 500 can further include an operation 506. At the operation 506, for example, the wireless charger 138 can be caused to be disposed next to the electrode 108. For example, the wireless charger 138 can be configured to charge the mobile device 302.

For example, the first device 110 can include one or more of the conductor 140 or the switch 142.

For example, if the first device 110 includes the switch 142, then the switch 142 can be configured be disposed on the vehicle 106 so that the passenger of the vehicle 106 can operate the switch 142. Alternatively or additionally, for example, if the first device 110 includes the switch 142, then the switch 142 can be configured to be operated in a different manner. For example, operation of the switch 142 may be controlled by application software being executed by the mobile device 302.

For example, if the first device 110 includes the switch 142, then the method 500 can further include an operation 508 and an operation 510.

At the operation 508, for example, the tactile sensor 144 can be caused to be disposed within the structure 112 of the vehicle 106. For example, the tactile sensor 144 can be configured to detect the physical contact of the object 102 with the region 118 of the surface 104.

At the operation 510, for example, the controller 146 can be caused to be disposed within the vehicle 106. For example, the controller 146 can be configured to control the position of the switch 142 so that, at the time at which the physical contact of the object 102 with the region 118 of the surface 104 is detected by the tactile sensor 144, the controller 146 can cause the position of the switch 142 to be the closed position. Additionally, for example, the controller 146 can be further configured to control the position of the switch 142 so that, at the time at which the lack of the physical contact of the object 102 with the region 118 of the surface 104 is detected by the tactile sensor 144, the controller 146 can cause the position of the switch 142 to be the opened position.

For example, the method 500 can further include an operation 512. At the operation 512, for example, the circuitry 148 can be caused to be disposed within the vehicle 106. For example, the circuitry 148 can be configured to receive, from the voltage source 120, the voltage at the first voltage level. For example, the circuitry 148 can be configured to increase the voltage from the first voltage level to the second voltage level. For example, the second voltage level can be equal to or greater than one kilovolt. For example, the circuitry 148 can be configured to cause the voltage at the second voltage level to be applied to the electrode 108. For example, the circuitry 148 can include one or more of a capacitor, a voltage multiplier, a voltage doubler, a voltage converter, a step-up converter, a boost converter, a DC-to-DC converter, a transformer, a motor-generator, or the like.

With reference to FIGS. 1 through 4, for example, the electrode 108 can include the array of electrodes 402.

For example, the array of electrodes 402 can include the first electrode 404 and the second electrode 406. For example, the shape 408 of the first electrode 404 can define the shape 410 of the region 412 of the dashboard 202 as the surface 104. The shape 410 can correspond to the shape 324 of the cup holder 318. For example, the shape 414 of the second electrode 406 can define the shape 416 of the region 418 of the sunglasses holder cover 228 as the surface 104. The shape 416 can correspond to the shape 326 of the device 320 configured to be attached to the pair of sunglasses 306. Additionally, for example, the magnitude of the electrostatic force produced by the second electrode 406 can be sufficient to support the pair of sunglasses 306 while the magnitude of the electrostatic force produced by the first electrode 404 can be sufficient to support the cup 304 at the time at which the cup 304 contains 40 fluid ounces of a beverage.

For example, the first device 110 can include the array of switches 420. For example, the array of electrodes 402 can further include the third electrode 422, the fourth electrode 424, the fifth electrode 426, and the sixth electrode 428. For example, the array of switches 420 can include the first switch 430, the second switch 432, the third switch 434, and the fourth switch 436. For example, the first switch 430 can be associated with the third electrode 422, the second switch 432 can be associated with the fourth electrode 424, the third switch 434 can be associated with the fifth electrode 426, and the fourth switch 436 can be associated with the sixth electrode 428.

For example, the controller 146 can be configured to control the positions of the first switch 430, the second switch 432, the third switch 434, and the fourth switch 436 so that the shape of the region of the surface 104 can conform to the shape 136 of the object 102.

Additionally, for example, the tactile sensor 144 can include the array of tactile sensors 446. For example, the array of tactile sensors 446 can include the first tactile sensor 448, the second tactile sensor 450, the third tactile sensor 452, and the fourth tactile sensor 454. For example, the first tactile sensor 448 can be associated with the first switch 430 and the third electrode 422, the second tactile sensor 450 can be associated with the second switch 432 and the fourth electrode 424, the third tactile sensor 452 can be associated with the third switch 434 and the fifth electrode 426, and the fourth tactile sensor 454 can be associated with the fourth switch 436 and the sixth electrode 428.

For example, the controller 146 can be configured to control the positions of the first switch 430, the second switch 432, the third switch 434, and the fourth switch 436 so that, at the time at which the physical contact of the object 102 with the region 440 of the surface 104 is detected by the first tactile sensor 448 and the second tactile sensor 450, the positions of the first switch 430 and the second switch 432 can be caused to be the closed positions. Additionally, for example, the controller 146 can be configured to control the positions of the first switch 430, the second switch 432, the third switch 434, and the fourth switch 436 so that, at the time at which the lack of the physical contact of the object 102 with the region 440 of the surface 104 is detected by the first tactile sensor 448 and the second tactile sensor 450, the positions of the first switch 430 and the second switch 432 can be caused to be the opened positions.

Figure 6:
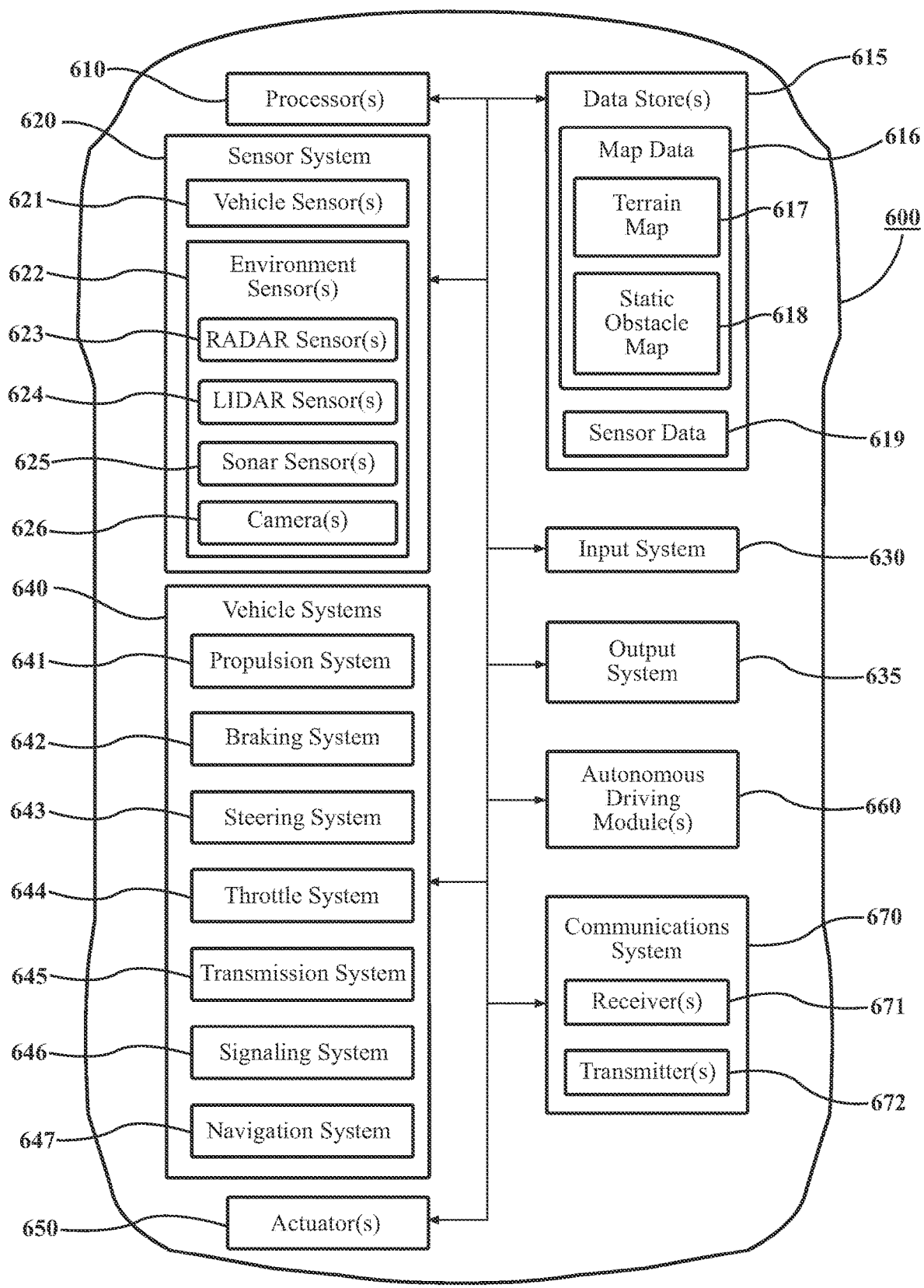
FIG. 6 includes a block diagram that illustrates an example of elements disposed on a vehicle, according to the disclosed technologies.

FIG. 6 includes a block diagram that illustrates an example of elements disposed on a vehicle 600, according to the disclosed technologies. As used herein, a "vehicle" can be any form of powered transport. In one or more implementations, the vehicle 600 can be an automobile. While arrangements described herein are with respect to automobiles, one of skill in the art understands, in light of the description herein, that embodiments are not limited to automobiles.

In some embodiments, the vehicle 600 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 600 is performed according to inputs received from a user (e.g., human driver). In one or more arrangements, the vehicle 600 can be a conventional vehicle that is configured to operate in only a manual mode.

In one or more embodiments, the vehicle 600 can be an automated vehicle. As used herein, "automated vehicle" can refer to a vehicle that operates in an automated mode. As used herein, "automated mode" can refer to navigating and/or maneuvering the vehicle 600 along a travel route using one or more computing systems to control the vehicle 600 with minimal or no input from a human driver. In one or more embodiments, the vehicle 600 can be highly automated or completely automated. In one embodiment, the vehicle 600 can be configured with one or more semi-automated operational modes in which one or more computing systems perform a portion of the navigation and/or maneuvering of the vehicle along a travel route, and a vehicle operator (i.e., driver) provides inputs to the vehicle 600 to perform a portion of the navigation and/or maneuvering of the vehicle 600 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 600 can include various elements. The vehicle 600 can have any combination of the various elements illustrated in FIG. 6. In various embodiments, it may not be necessary for the vehicle 600 to include all of the elements illustrated in FIG. 6. Furthermore, the vehicle 600 can have elements in addition to those illustrated in FIG. 6. While the various elements are illustrated in FIG. 6 as being located within the vehicle 600, one or more of these elements can be located external to the vehicle 600. Furthermore, the elements illustrated may be physically separated by large distances. For example, as described, one or more components of the disclosed system can be implemented within the vehicle 600 while other components of the system can be implemented within a cloud-computing environment, as described below. For example, the elements can include one or more processors 610, one or more data stores 615, a sensor system 620, an input system 630, an output system 635, vehicle systems 640, one or more actuators 650, one or more automated driving modules 660, and a communications system 670.

In one or more arrangements, the one or more processors 610 can be a main processor of the vehicle 600. For example, the one or more processors 610 can be an electronic control unit (ECU).

The one or more data stores 615 can store, for example, one or more types of data. The one or more data store 615 can include volatile memory and/or non-volatile memory. Examples of suitable memory for the one or more data stores 615 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 615 can be a component of the one or more processors 610. Additionally or alternatively, the one or more data stores 615 can be operatively connected to the one or more processors 610 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 615 can store map data 616. The map data 616 can include maps of one or more geographic areas. In some instances, the map data 616 can include information or data on roads, traffic control devices, road markings, structures, features, and/or landmarks in the one or more geographic areas. The map data 616 can be in any suitable form. In some instances, the map data 616 can include aerial views of an area. In some instances, the map data 616 can include ground views of an area, including 360-degree ground views. The map data 616 can include measurements, dimensions, distances, and/or information for one or more items included in the map data 616 and/or relative to other items included in the map data 616. The map data 616 can include a digital map with information about road geometry. The map data 616 can be high quality and/or highly detailed.

In one or more arrangements, the map data 616 can include one or more terrain maps 617. The one or more terrain maps 617 can include information about the ground, terrain, roads, surfaces, and/or other features of one or more geographic areas. The one or more terrain maps 617 can include elevation data of the one or more geographic areas. The map data 616 can be high quality and/or highly detailed. The one or more terrain maps 617 can define one or more ground surfaces, which can include paved roads, unpaved roads, land, and other things that define a ground surface.

In one or more arrangements, the map data 616 can include one or more static obstacle maps 618. The one or more static obstacle maps 618 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 618 can have location data, size data, dimension data, material data, and/or other data associated with them. The one or more static obstacle maps 618 can include measurements, dimensions, distances, and/or information for one or more static obstacles. The one or more static obstacle maps 618 can be high quality and/or highly detailed. The one or more static obstacle maps 618 can be updated to reflect changes within a mapped area.

In one or more arrangements, the one or more data stores 615 can store sensor data 619. As used herein, "sensor data" can refer to any information about the sensors with which the vehicle 600 can be equipped including the capabilities of and other information about such sensors. The sensor data 619 can relate to one or more sensors of the sensor system 620. For example, in one or more arrangements, the sensor data 619 can include information about one or more lidar sensors 624 of the sensor system 620.

In some arrangements, at least a portion of the map data 616 and/or the sensor data 619 can be located in one or more data stores 615 that are located onboard the vehicle 600. Alternatively or additionally, at least a portion of the map data 616 and/or the sensor data 619 can be located in one or more data stores 615 that are located remotely from the vehicle 600.

The sensor system 620 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 620 includes a plurality of sensors, the sensors can work independently from each other. Alternatively, two or more of the sensors can work in combination with each other. In such a case, the two or more sensors can form a sensor network. The sensor system 620 and/or the one or more sensors can be operatively connected to the one or more processors 610, the one or more data stores 615, and/or another element of the vehicle 600 (including any of the elements illustrated in FIG. 6). The sensor system 620 can acquire data of at least a portion of the external environment of the vehicle 600 (e.g., nearby vehicles). The sensor system 620 can include any suitable type of sensor. Various examples of different types of sensors are described herein. However, one of skill in the art understands that the embodiments are not limited to the particular sensors described herein.

The sensor system 620 can include one or more vehicle sensors 621. The one or more vehicle sensors 621 can detect, determine, and/or sense information about the vehicle 600 itself. In one or more arrangements, the one or more vehicle sensors 621 can be configured to detect and/or sense position and orientation changes of the vehicle 600 such as, for example, based on inertial acceleration. In one or more arrangements, the one or more vehicle sensors 621 can include one or more accelerometers, one or more gyroscopes, an inertial measurement unit (IMU), a dead-reckoning system, a global navigation satellite system (GNSS), a global positioning system (GPS), a navigation system 647, and/or other suitable sensors. The one or more vehicle sensors 621 can be configured to detect and/or sense one or more characteristics of the vehicle 600. In one or more arrangements, the one or more vehicle sensors 621 can include a speedometer to determine a current speed of the vehicle 600.

Alternatively or additionally, the sensor system 620 can include one or more environment sensors 622 configured to acquire and/or sense driving environment data. As used herein, "driving environment data" can include data or information about the external environment in which a vehicle is located or one or more portions thereof. For example, the one or more environment sensors 622 can be configured to detect, quantify, and/or sense obstacles in at least a portion of the external environment of the vehicle 600 and/or information/data about such obstacles. Such obstacles may be stationary objects and/or dynamic objects. The one or more environment sensors 622 can be configured to detect, measure, quantify, and/or sense other things in the external environment of the vehicle 600 such as, for example, lane markers, signs, traffic lights, traffic signs, lane lines, crosswalks, curbs proximate the vehicle 600, off-road objects, etc.

Various examples of sensors of the sensor system 620 are described herein. The example sensors may be part of the one or more vehicle sensors 621 and/or the one or more environment sensors 622. However, one of skill in the art understands that the embodiments are not limited to the particular sensors described.

In one or more arrangements, the one or more environment sensors 622 can include one or more radar sensors 623, one or more lidar sensors 624, one or more sonar sensors 625, and/or one more cameras 626. In one or more arrangements, the one or more cameras 626 can be one or more high dynamic range (HDR) cameras or one or more infrared (IR) cameras. For example, the one or more cameras 626 can be used to record a reality of a state of an item of information that can appear in the digital map.

The input system 630 can include any device, component, system, element, arrangement, or groups thereof that enable information/data to be entered into a machine. The input system 630 can receive an input from a vehicle passenger (e.g., a driver or a passenger). The output system 635 can include any device, component, system, element, arrangement, or groups thereof that enable information/data to be presented to a vehicle passenger (e.g., a driver or a passenger).

Various examples of the one or more vehicle systems 640 are illustrated in FIG. 6. However, one of skill in the art understands that the vehicle 600 can include more, fewer, or different vehicle systems. Although particular vehicle systems can be separately defined, each or any of the systems or portions thereof may be otherwise combined or segregated via hardware and/or software within the vehicle 600. For example, the one or more vehicle systems 640 can include a propulsion system 641, a braking system 642, a steering system 643, a throttle system 644, a transmission system 645, a signaling system 646, and/or the navigation system 647. Each of these systems can include one or more devices, components, and/or a combination thereof, now known or later developed.

The navigation system 647 can include one or more devices, applications, and/or combinations thereof, now known or later developed, configured to determine the geographic location of the vehicle 600 and/or to determine a travel route for the vehicle 600. The navigation system 647 can include one or more mapping applications to determine a travel route for the vehicle 600. The navigation system 647 can include a global positioning system, a local positioning system, a geolocation system, and/or a combination thereof.

The one or more actuators 650 can be any element or combination of elements operable to modify, adjust, and/or alter one or more of the vehicle systems 640 or components thereof responsive to receiving signals or other inputs from the one or more processors 610 and/or the one or more automated driving modules 660. Any suitable actuator can be used. For example, the one or more actuators 650 can include motors, pneumatic actuators, hydraulic pistons, relays, solenoids, and/or piezoelectric actuators.

The one or more processors 610 and/or the one or more automated driving modules 660 can be operatively connected to communicate with the various vehicle systems 640 and/or individual components thereof. For example, the one or more processors 610 and/or the one or more automated driving modules 660 can be in communication to send and/or receive information from the various vehicle systems 640 to control the movement, speed, maneuvering, heading, direction, etc. of the vehicle 600. The one or more processors 610 and/or the one or more automated driving modules 660 may control some or all of these vehicle systems 640 and, thus, may be partially or fully automated.

The one or more processors 610 and/or the one or more automated driving modules 660 may be operable to control the navigation and/or maneuvering of the vehicle 600 by controlling one or more of the vehicle systems 640 and/or components thereof. For example, when operating in an automated mode, the one or more processors 610 and/or the one or more automated driving modules 660 can control the direction and/or speed of the vehicle 600. The one or more processors 610 and/or the one or more automated driving modules 660 can cause the vehicle 600 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 670 can include one or more receivers 671 and/or one or more transmitters 672. The communications system 670 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 670 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The vehicle 600 can include one or more modules, at least some of which are described herein. The modules can be implemented as computer-readable program code that, when executed by the one or more processors 610, implement one or more of the various processes described herein. One or more of the modules can be a component of the one or more processors 610. Alternatively or additionally, one or more of the modules can be executed on and/or distributed among other processing systems to which the one or more processors 610 can be operatively connected. The modules can include instructions (e.g., program logic) executable by the one or more processors 610. Alternatively or additionally, the one or more data store 615 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 600 can include one or more automated driving modules 660. The one or more automated driving modules 660 can be configured to receive data from the sensor system 620 and/or any other type of system capable of capturing information relating to the vehicle 600 and/or the external environment of the vehicle 600. In one or more arrangements, the one or more automated driving modules 660 can use such data to generate one or more driving scene models. The one or more automated driving modules 660 can determine position and velocity of the vehicle 600. The one or more automated driving modules 660 can determine the location of obstacles, obstacles, or other environmental features including traffic signs, trees, shrubs, neighboring vehicles, pedestrians, etc.

The one or more automated driving modules 660 can be configured to receive and/or determine location information for obstacles within the external environment of the vehicle 600 for use by the one or more processors 610 and/or one or more of the modules described herein to estimate position and orientation of the vehicle 600, vehicle position in global coordinates based on signals from a plurality of satellites, or any other data and/or signals that could be used to determine the current state of the vehicle 600 or determine the position of the vehicle 600 with respect to its environment for use in either creating a map or determining the position of the vehicle 600 in respect to map data.

The one or more automated driving modules 660 can be configured to determine one or more travel paths, current automated driving maneuvers for the vehicle 600, future automated driving maneuvers and/or modifications to current automated driving maneuvers based on data acquired by the sensor system 620, driving scene models, and/or data from any other suitable source such as determinations from the sensor data 619. As used herein, "driving maneuver" can refer to one or more actions that affect the movement of a vehicle. Examples of driving maneuvers include: accelerating, decelerating, braking, turning, moving in a lateral direction of the vehicle 600, changing travel lanes, merging into a travel lane, and/or reversing, just to name a few possibilities. The one or more automated driving modules 660 can be configured to implement determined driving maneuvers. The one or more automated driving modules 660 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 660 can be configured to execute various vehicle functions and/or to transmit data to, receive data from, interact with, and/or control the vehicle 600 or one or more systems thereof (e.g., one or more of vehicle systems 640). For example, functions and/or operations of an automotive navigation system can be realized by the one or more automated driving modules 660.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-6, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
an electrode configured to be disposed within a structure of a vehicle, the structure defining a surface of the vehicle, a shape of the electrode defining a shape of a region of the surface; and
a first device configured to connect the electrode to a voltage source so that, at a time at which the electrode is connected to the voltage source, an electric charge having a first polarity is produced on the electrode to produce an electrostatic force capable of causing an object to adhere to the surface.

2. The system of claim 1, wherein the object is made of a material having a property associated with an ability to hold an electric charge having a second polarity, a value of the property for the material being greater than an average value of the property for materials.

3. The system of claim 2, wherein the property comprises at least one of a surface potential discharge rate, a layer capacitance, or a volume resistance.

4. The system of claim 1, wherein the object comprises at least one of a mobile device, a cup, a pair of sunglasses, an item made of paper, or a piece of fruit.

5. The system of claim 4:
wherein the object comprises the mobile device; and
further comprising a wireless charger configured to be disposed next to the electrode and configured to charge the mobile device.

6. The system of claim 4:
wherein the object comprises at least one of the cup or the pair of sunglasses; and
further comprising a second device made of a first material and configured to at least one of support the object, hold the object, adhere to the object, or be attached to the object, the first material having a property associated with an ability to hold an electric charge having a second polarity, a value of the property for the first material being greater than an average value of the property for materials.

7. The system of claim 6, wherein:
the object comprises the cup;
the second device is further made of a second material, the second material having a property associated with elasticity, a value of the property associated with elasticity for the second material being greater than an average value of the property associated with elasticity for the materials; and a shape of the second device is configured to change, at the time at which the electrode is connected to the voltage source, to conform to a shape of a side of the cup.

8. The system of claim 1, wherein the first device comprises at least one of a conductor or a switch.

9. The system of claim 8:
wherein the device comprises the switch; and
further comprising:
a tactile sensor configured to be disposed within the structure of the vehicle and to detect a physical contact of the object with the region of the surface; and
a controller configured to control a position of the switch so that, at a time at which the physical contact of the object with the region of the surface is detected by the tactile sensor, the controller causes the position of the switch to be a closed position.

10. The system of claim 9, wherein the controller is further configured to control the position of the switch so that, at a time at which a lack of the physical contact of the object with the region of the surface is detected by the tactile sensor, the controller causes the position of the switch to be an opened position.

11. The system of claim 1, further comprising circuitry configured to:
receive, from the voltage source, a voltage at a first voltage level;
increase the voltage from the first voltage level to a second voltage level; and
cause the voltage at the second voltage level to be applied to the electrode.

12. The system of claim 11, wherein the circuitry comprises at least one of a capacitor, a voltage multiplier, a voltage doubler, a voltage converter, a step-up converter, a boost converter, a DC-to-DC converter, a transformer, or a motor-generator.

13. The system of claim 11, wherein the second voltage level is equal to or greater than one kilovolt.

14. The system of claim 1, wherein the electrode comprises an array of electrodes.

15. The system of claim 14:
wherein:
the first device comprises an array of switches, and
a switch, of the array of switches, is associated with a corresponding electrode of the array of electrodes; and
further comprising a controller configured to control positions of switches of the array of switches so that the shape of the region of the surface conforms to a shape of the object.

16. The system of claim 15:
further comprising a tactile sensor configured to be disposed within the structure of the vehicle and to detect a physical contact of the object with the region of the surface,
wherein the controller is configured to control the positions of the switches so that, at a time at which the physical contact of the object with the region of the surface is detected by the tactile sensor, the controller causes the positions of the switches to be closed positions.

17. The system of claim 16, wherein the controller is further configured to control the positions of the switches so that, at a time at which a lack of the physical contact of the object with the region of the surface is detected by the tactile sensor, the controller causes the positions of the switches to be opened positions.

18. A vehicle, comprising:
vehicle systems comprising a voltage source, a propulsion system, a transmission system, a throttle system, a braking system, and a steering system; and
an electrode disposed within a structure of the vehicle, the structure defining a surface of the vehicle, a shape of the electrode defining a shape of a region of the surface at which an electrostatic force is producible at a time at which the voltage source is connected to the electrode, the electrostatic force capable of causing an object to adhere to the surface.

19. A method, comprising:
causing an electrode to be disposed within a structure of a vehicle, the structure defining a surface of the vehicle, a shape of the electrode defining a shape of a region of the surface; and
causing a device to be disposed within the vehicle, the device configured to connect the electrode to a voltage source so that, at a time at which the electrode is connected to the voltage source, an electric charge is produced on the electrode to produce an electrostatic force capable of causing an object to adhere to the surface.

20. The method of claim 19, wherein the surface of the vehicle comprises at least one of a dashboard, a dashboard vent frame, a glove compartment cover, an airbag cover, a steering wheel, a column cover, a horn portion of the steering wheel, a console, a central console, a cup holder, an under-dashboard, a door interior panel, an overhead console, a sunglasses holder cover, or a sun visor.

* * * * *